United States Patent
Rohde et al.

(10) Patent No.: US 6,756,030 B1
(45) Date of Patent: Jun. 29, 2004

(54) CRYSTALLINE ALUMINOSILICATE ZEOLITIC COMPOSITION: UZM-8

(75) Inventors: Lisa M. Rohde, Chicago, IL (US); Gregory J. Lewis, Mount Prospect, IL (US); Mark A. Miller, Niles, IL (US); Jaime G. Moscoso, Mount Prospect, IL (US); Jana L. Gisselquist, Evanston, IL (US); R. Lyle Patton, Rolling Meadows, IL (US); Stephen T. Wilson, Libertyville, IL (US); Deng Yang Jan, Elk Grove Village, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/395,466

(22) Filed: Mar. 21, 2003

(51) Int. Cl.[7] .......................... C01B 39/48; C10G 11/05
(52) U.S. Cl. ................. 423/718; 423/328.2; 423/329.1; 423/705; 208/46
(58) Field of Search .......................... 423/718, 328.2, 423/329.1, 705; 208/46

(56) References Cited

U.S. PATENT DOCUMENTS 4,826,667 A * 5/1989 Zones et al. ................. 423/706
5,236,575 A    8/1993 Bennett et al. ................ 208/46
5,310,715 A * 5/1994 Kresge et al. ................. 502/84
5,362,697 A    11/1994 Fung et al. .................... 502/71

OTHER PUBLICATIONS

J. Phys. Chem., 1996, 100, p. 3788–3798.

* cited by examiner

*Primary Examiner*—David Sample
(74) *Attorney, Agent, or Firm*—John G. Tolomei; Frank S. Molinaro

(57) ABSTRACT

Applicants have synthesized a family of microporous aluminosilicate zeolites and substituted versions thereof which are identified as UZM-8. These new compositions can be prepared using either only one or more organoammonium cations, such as diethyldimethylammonium or ethyltrimethylammonium cations and optionally an alkali and/or an alkaline earth cation as structure directing agents. The UZM-8 compositions are described by an empirical formula of $$M_m{}^{n+}R_r{}^{p+}Al_{1-x}E_xSi_yO_z$$

and have a unique x-ray diffraction pattern.

22 Claims, 2 Drawing Sheets

CRYSTALLINE ALUMINOSILICATE ZEOLITIC COMPOSITION: UZM-8

FIELD OF THE INVENTION

This invention relates to an aluminosilicate zeolite designated UZM-8 a method of preparing the zeolite and various uses thereof. These zeolites can be used as catalysts in processes such as xylene isomerization and ethylbenzene synthesis.

BACKGROUND OF THE INVENTION

Zeolites are crystalline aluminosilicate compositions which are microporous and which are formed from corner sharing $AlO_2$ and $SiO_2$ tetrahedra. Numerous zeolites, both naturally occurring and synthetically prepared are used in various industrial processes. Synthetic zeolites are prepared via hydrothermal synthesis employing suitable sources of Si, Al, as well as structure directing agents such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversions, which can take place on outside surfaces as well as on internal surfaces within the pore.

Applicants have synthesized a new family of materials designated UZM-8. The UZM-8 compositions are aluminosilicates having Si/Al molar ratio from about 6.5 to about 35. The UZM-8 compositions show unique x-ray diffraction patterns compared to other known zeolites. These UZM-8 compositions are prepared from aqueous reaction mixtures containing either organoammonium compounds or a mixture of organoammonium compounds and alkali and/or alkaline earth compounds. The organoammonium compounds used to make UZM-8 are non-cyclic nor contain cyclic substituents and are generally quite simple. Preferred examples of organoammonium compounds used to make UZM-8 include the diethyldimethylammonium (DEDMA), ethyltrimethylammonium (ETMA) or hexamethonium (HM) cations.

Although UZM-8 compositions have some similarities to a layered material identified as MCM-56, there are sufficient differences that UZM-8 compositions are structurally different from MCM-56 materials and thus are unique new zeolites structures. The preparation of MCM-56 is disclosed in U.S. Pat. No. 5,362,697 where it is stated that MCM-56 is prepared from a reaction mixture containing a combination of alkali metals and hexamethylene imine (HMI) as directing agents and requires that the silica source be a predominately solid silica source comprising at least 30 wt. % $SiO_2$. It is further stated in the '697 patent that the reaction must be stopped and quenched at a time before significant amounts of MCM-49 form in the reaction mixture. The synthesis of MCM-49 is disclosed in U.S. Pat. No. 5,236,575 and again involves a combination of alkali metals and HMI structure directing agents plus a predominately solid silica source comprising at least 30 wt. % $SiO_2$. Upon calcination the MCM-49 composition is not readily distinguishable from calcined MCM-22 which has the MWW framework topology. It is further stated in J. Phys. Chem., 1996, 100, p.3788–3798, that in the as-synthesized form MCM-49 has essentially the MWW topology. Thus, MCM-56 is an intermediate structure in the formation of MCM-49 which in the calcined form is virtually the same as MCM-22 both of which have the MWW structure. The '697 patent further describes the MCM-56 as a layered structure in both its as-synthesized and calcined forms based on the claimed swellability of the material.

In contrast to MCM-56, UZM-8 is not an intermediate in the formation of MCM-49. Additionally, the UZM-8 materials can be synthesized from an alkali free reaction mixture using an organoammonium cation such as DEDMA cation that offers great stability and robustness without the formation of MCM-49 or other impurities. However, in the HMI/Na system, varying the relative amount of amine structure directing agent to alkali metal and/or alkaline earth metal compound can yield either the MCM-56/MCM-49 system with higher relative alkali content or a precursor to MCM-22 with lower relative alkali content. Reaction conditions, mainly temperature and time, are used to distinguish MCM-56 and MCM-49 in the higher alkali content system that is difficult to control, leading to the requirement for quenching the MCM-56 reaction mixture before significant amounts of MCM-49 form. Finally, UZM-8 is a layered material in that the as-synthesized form is swellable and has a x-ray diffraction pattern that is distinguishable from MCM-56.

The UZM-8 materials of this invention are thermally stable and can be used in their acidic forms as catalysts in hydrocarbon conversion processes, including ethylbenzene synthesis and xylene isomerization, but also in separation processes, adsorption, and ion-exchange applications.

SUMMARY OF THE INVENTION

As stated, the present invention relates to a family of aluminosilicate and substituted aluminosilicate zeolites designated UZM-8. Accordingly, one embodiment of the invention is a microporous crystalline zeolite having a layered framework of at least $AlO_2$ and $SiO_2$ tetrahedral units and a composition on an as-synthesized and anhydrous basis expressed by an empirical formula of:

$$M_m^{n+}R_r^{p+}Al_{1-x}E_xSi_yO_z$$

where M is at least one exchangeable cation selected from the group consisting of alkali and alkaline earth metals, "m" is the mole ratio of M to (Al+E) and varies from 0 to about 2.0, R is at least one organoammonium cation selected from the group consisting of quaternary ammonium cations, diquaternary ammonium, protonated amines, protonated diamines, protonated alkanoamines and quaternized alkanolammonium, "r" is the mole ratio of R to (Al+E) and has a value of about 0.05 to about 5.0, "n" is the weighted average valence of M and has a value of about 1 to about 2, "p" is the weighted average valence of R and has a value of about 1 to about 2, E is an element selected from the group consisting of gallium, iron, boron, chromium, indium and mixtures thereof, "x" is the mole fraction of E and has a value from 0 to about 1.0, "y" is the mole ratio of Si to (Al+E) and varies from about 6.5 to about 35 and "z" is the mole ratio of O to (Al+E) and has a value determined by the equation:

$$z=(m \cdot n+r \cdot p+3+4 \cdot y)/2$$

and is characterized in that it has the x-ray diffraction pattern having at least the d spacings and relative intensities set forth in Table A.

TABLE A

| 2-θ | d (Å) | I/I₀ % |
|---|---|---|
| 6.40–6.90 | 13.80–12.80 | w–s |
| 6.95–7.42 | 12.70–11.90 | m–s |
| 8.33–9.11 | 10.60–9.70 | w–vs |
| 19.62–20.49 | 4.52–4.33 | m–vs |
| 21.93–22.84 | 4.05–3.89 | m–vs |
| 24.71–25.35 | 3.60–3.51 | w–m |
| 25.73–26.35 | 3.46–3.38 | m–vs |

Another embodiment of the invention is a process for preparing the crystalline microporous zeolite described above. The process comprises forming a reaction mixture containing reactive sources of R, Al, Si and optionally M and E and reacting the reaction mixture at reaction conditions which include a temperature of about 85° C. to about 225° C., for a period of time of about 1 day to about 28 days, the reaction mixture having a composition expressed in terms of mole ratios of the oxides of:

$$aM_{2/n}O:bR_{2/p}O:1-cAl_2O_3:cE_2O_3:dSiO_2:eH_2O$$

where "a" has a value from 0 to about 25, "b" has a value of about 1.5 to about 80, "c" has a value of 0 to about 1.0, "d" has a value of about 10 to about 100, "e" has a value of about 100 to about 15000.

Yet another embodiment of the invention is a hydrocarbon conversion process using the above-described zeolite. The process comprises contacting the hydrocarbon with the zeolite at conversion conditions to give a hydroconverted hydrocarbon.

DETAILED DESCRIPTION OF THE INVENTION

Figure 1A:
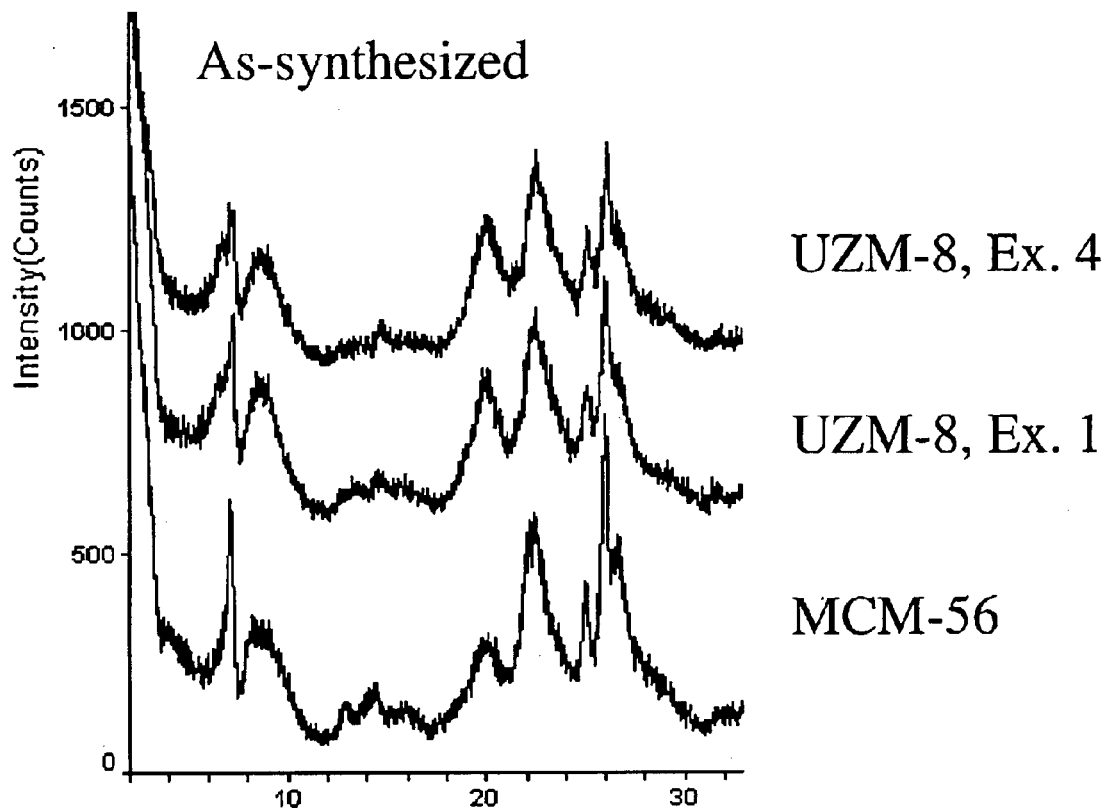
FIG. 1a presents x-ray diffraction patterns for as-synthesized UZM-8 compositions of examples 1 and 4, and for zeolite MCM-56.

Applicants have prepared a family of aluminosilicate and substituted aluminosilicate zeolites which are designated UZM-8. In one embodiment of the invention, UZM-8 zeolites are prepared in an alkali-free reaction medium in which only one or more organoammonium species are used as structure directing agents. In this case, the microporous crystalline zeolite (UZM-8) has a composition in the as-synthesized form and on an anhydrous basis expressed by the empirical formula:

$$R_r^{p+}Al_{1-x}E_xSi_yO_z$$

where R is at least one organoammonium cation selected from the group consisting of protonated amines, protonated diamines, quaternary ammonium ions, diquaternary ammonium ions, protonated alkanolamines and quaternized alkanolammonium ions. Preferred organoammonium cations are those that are non-cyclic or those that that do not contain a cyclic group as one substituent. Of these those that contain at least two methyl groups as substituents are especially preferred. Examples of preferred cations include without limitation DEDMA, ETMA, HM and mixtures thereof. The ratio of R to (Al+E) is represented by "r" which varies from about 0.05 to about 5. The value of "p" which is the weighted average valence of R varies from 1 to about 2. The ratio of Si to (Al+E) is represented by "y" which varies from about 6.5 to about 35. E is an element which is tetrahedrally coordinated, is present in the framework and is selected from the group consisting of gallium, iron, chromium, indium and boron. The mole fraction of E is represented by "x" and has a value from 0 to about 0.5, while "z" is the mole ratio of O to (Al+E) and is given by the equation $$z=(r \cdot p+3+4 \cdot y)/2.$$

In another embodiment of the invention, the UZM-8 zeolites can be prepared using both organoammonium cations and alkali and/or alkaline earth cations as structure directing agents. As in the alkali-free case above, the same organoammonium cations can be used here. Alkali or alkaline earth cations are observed to speed up the crystallization of UZM-8, often when present in amounts less than 0.05 M⁺/Si. For the alkali and/or alkaline earth metal containing systems, the microporous crystalline zeolite (UZM-8) has a composition in the as-synthesized form and on an anhydrous basis expressed by the empirical formula:

$$M_m^{n+}R_r^{p+}Al_{1-x}E_xSi_yO_z$$

where M is at least one exchangeable cation and is selected from the group consisting of alkali and alkaline earth metals. Specific examples of the M cations include but are not limited to lithium, sodium, potassium, rubidium, cesium, calcium, strontium, barium and mixtures thereof. Preferred R cations include without limitation DEDMA, ETMA, HM and mixtures thereof. The value of "m" which is the ratio of M to (Al+E) varies from about 0.01 to about 2. The value of "n" which is the weighted average valence of M varies from about 1 to about 2. The ratio of R to (Al+E) is represented by "r" which varies from 0.05 to about 5. The value of "p" which is the weighted average valence of R varies from about 1 to about 2. The ratio of Si to (Al+E) is represented by "y" which varies from about 6.5 to about 35. E is an element which is tetrahedrally coordinated, is present in the framework and is selected from the group consisting of gallium, iron, chromium, indium and boron. The mole fraction of E is represented by "x" and has a value from 0 to about 0.5, while "z" is the mole ratio of O to (Al+E) and is given by the equation $$z=(m \cdot n+r \cdot p+3+4 \cdot y)/2$$

where M is only one metal, then the weighted average valence is the valence of that one metal, i.e. +1 or +2. However, when more than one M metal is present, the total amount of $$M_m^{n+}=M_{m1}^{(n1)+}+M_{m2}^{(n2)+}+M_{m3}^{(n3)+}+ \ldots$$

and the weighted average valence "n" is given by the equation:

$$n = \frac{m_1 \cdot n_1 + m_2 \cdot n_2 + m_3 \cdot n_3 + \cdots}{m_1 + m_2 + m_3 \cdots}$$

Similarly when only one R organic cation is present, the weighted average valence is the valence of the single R cation, i.e., +1 or +2. When more than one R cation is present, the total amount of R is given by the equation.

$$R_r^{p+}=R_{r1}^{(p1)+}+R_{r2}^{(p2)+}+R_{r3}^{(p3)+}+ \ldots$$

and the weighted average valence "p" is given by the equation $$p = \frac{p_1 \cdot r_1 + p_2 \cdot r_2 + p_3 \cdot r_3 + \cdots}{r_1 + r_2 + r_3 + \cdots}$$

The microporous crystalline zeolites of the present invention are prepared by a hydrothermal crystallization of a reaction mixture prepared by combining reactive sources of R, aluminum, silicon and optionally M and E. The sources of aluminum include but are not limited to aluminum alkoxides, precipitated aluminas, aluminum metal, sodium aluminate, organoammonium aluminates, aluminum salts and alumina sols. Specific examples of aluminum alkoxides include, but are not limited to aluminum ortho sec-butoxide and aluminum ortho isopropoxide. Sources of silica include but are not limited to tetraethylorthosilicate, colloidal silica, precipitated silica, alkali silicates and organoammonium silicates. A special reagent consisting of an organoammonium aluminosilicate solution can also serve as the simultaneous source of Al, Si, and R. Sources of the E elements include but are not limited to alkali borates, boric acid, precipitated gallium oxyhydroxide, gallium sulfate, ferric sulfate, ferric chloride, chromium nitrate and indium chloride. Sources of the M metals include the halide salts, nitrate salts, acetate salts, and hydroxides of the respective alkali or alkaline earth metals. R can be introduced as an organoammonium cation or an amine. When R is a quaternary ammonium cation or a quaternized alkanolammonium cation, the sources include but are not limited the hydroxide, chloride, bromide, iodide and fluoride compounds. Specific examples include without limitation DEDMA hydroxide, ETMA hydroxide, tetramethylammonium hydroxide, tetraethylammonium hydroxide, hexamethonium bromide, tetrapropylammonium hydroxide, methyltriethylammonium hydroxide, tetramethylammonium chloride and choline chloride. R may also be introduced as an amine, diamine, or alkanolamine that subsequently hydrolyzes to form an organoammonium cation. Specific non-limiting examples are N,N,N',N'-tetramethyl -1,6-hexanediamine, triethylamine, and triethanolamine. Preferred sources of R without limitation are ETMAOH, DEDMAOH, and HM(OH)$_2$.

The reaction mixture containing reactive sources of the desired components can be described in terms of molar ratios of the oxides by the formula:

$$aM_{2/n}O:bR_{2/p}O:1-cAl_2O_3:cE_2O_3:dSiO_2:eH_2O$$

where "a" varies from 0 to about 25, "b" varies from about 1.5 to about 80, "c" varies from 0 to 1.0, "d" varies from about 10 to about 100, and "e" varies from about 100 to about 15000. If alkoxides are used, it is preferred to include a distillation or evaporative step to remove the alcohol hydrolysis products. The reaction mixture is now reacted at a temperature of about 85° C. to about 225° C. and preferably from about 125° C. to about 150° C. for a period of about 1 day to about 28 days and preferably for a time of about 5 days to about 14 days in a sealed reaction vessel under autogenous pressure. After crystallization is complete, the solid product is isolated from the heterogeneous mixture by means such as filtration or centrifugation, and then washed with deionized water and dried in air at ambient temperature up to about 100° C.

The UZM-8 aluminosilicate zeolite, which is obtained from the above-described process, is characterized by an x-ray diffraction pattern, having at least the d-spacings and relative intensities set forth in Table A below

TABLE A d-Spacings and Relative Intensities for as-synthesized UZM-8

| 2-θ | d (Å) | I/I$_0$ % |
|---|---|---|
| 6.40–6.90 | 13.80–12.80 | w–s |
| 6.95–7.42 | 12.70–11.90 | m–s |
| 8.33–9.11 | 10.60–9.70 | w–vs |
| 19.62–20.49 | 4.52–4.33 | m–vs |
| 21.93–22.84 | 4.05–3.89 | m–vs |
| 24.71–25.35 | 3.60–3.51 | w–m |
| 25.73–26.35 | 3.46–3.38 | m–vs |

The UZM-8 compositions are stable to at least 600° C. and usually at least 700° C. The characteristic diffraction lines associated with typical calcined UZM-8 samples are shown below in table B. The as-synthesized form of UZM-8 is expandable with organic cations, indicating a layered structure.

TABLE B d-Spacings and Relative Intensity for Calcined UZM-8

| 2-θ | d (Å) | I/I$_0$ % |
|---|---|---|
| 4.05–4.60 | 21.80–19.19 | w–m |
| 7.00–7.55 | 12.62–11.70 | m–vs |
| 8.55–9.15 | 10.33–9.66 | w–vs |
| 12.55–13.15 | 7.05–6.73 | w |
| 14.30–14.90 | 6.19–5.94 | m–vs |
| 19.55–20.35 | 4.54–4.36 | w–m |
| 22.35–23.10 | 3.97–3.85 | m–vs |
| 24.95–25.85 | 3.57–3.44 | w–m |
| 25.95–26.75 | 3.43–3.33 | m–s |

An aspect of the UZM-8 synthesis that contributes to some of its unique properties is that it can be synthesized from a homogenous solution. In this chemistry, soluble aluminosilicate precursors condense during digestion to form extremely small crystallites that have a great deal of external surface area and short diffusion paths within the pores of the crystallites. This can affect both adsorption and catalytic properties of the material.

As-synthesized, the UZM-8 material will contain some of the charge balancing cations in its pores. In the case of syntheses from alkali or alkaline earth metal-containing reaction mixtures, some of these cations may be exchangeable cations that can be exchanged for other cations. In the case of organoammonium cations, they can be removed by heating under controlled conditions. In the cases where UZM-8 is prepared in an alkali-free system, the organoammonium cations are best removed by controlled calcination, thus generating the acid form of the zeolite without any intervening ion-exchange steps. On the other hand, it may sometimes be possible to remove a portion of the organoammonium via ion exchange. In a special case of ion exchange, the ammonium form of UZM-8 may be generated via calcination of the organoammonium form of UZM-8 in an ammonia atmosphere.

The crystalline UZM-8 zeolites of this invention can be used for separating mixtures of molecular species, removing contaminants through ion exchange and catalyzing various hydrocarbon conversion processes. Separation of molecular species can be based either on the molecular size (kinetic diameter) or on the degree of polarity of the molecular species.

The UZM-8 zeolites of this invention can also be used as catalysts or catalyst support in various hydrocarbon conversion processes. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. Nos. 4,310,440 and 4,440,871 which are incorporated by reference. Preferred hydrocarbon conversion processes are those in which hydrogen is a component such as hydrotreating or hydrofining, hydrogenation, hydrocracking, hydrodenitrogenation, hydrodesulfurization, etc.

Hydrocracking conditions typically include a temperature in the range of 400° to 1200° F. (204–649° C.), preferably between 600° and 950° F. (316–510° C.). Reaction pressures are in the range of atmospheric to about 3,500 psig (24,132 kPa g), preferably between 200 and 3000 psig (1379–20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178–8,888 std. $m^3/m^3$), preferably between 2,000 and 30,000 scf per barrel of charge (355–5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the UZM-8 composition using feedstocks such as gas oils, heavy naphthas, deasphalted crude oil residua, etc. with gasoline being the principal desired product. Temperature conditions of 850° to 1100° F., LHSV values of 0.5 to 10 and pressure conditions of from about 0 to 50 psig are suitable.

Alkylation of aromatics usually involves reacting an aromatic ($C_2$ to $C_{12}$), especially benzene, with a monoolefin to produce a linear alkyl substituted aromatic. The process is carried out at an aromatic: olefin (e.g., benzene:olefin) ratio of between 5:1 and 30:1, a LHSV of about 0.3 to about 6 hr, a temperature of about 100° to about 250° C. and pressures of about 200 to about 1000 psig. Further details on apparatus may be found in U.S. Pat. No. 4,870,222 which is incorporated by reference.

Alkylation of isoparaffins with olefins to produce alkylates suitable as motor fuel components is carried out at temperatures of –30° to 40° C., pressures from about atmospheric to about 6,894 kPa (1,000 psig) and a weight hourly space velocity (WHSV) of 0.1 to about 120. Details on paraffin alkylation may be found in U.S. Pat. Nos. 5,157,196 and 5,157,197, which are incorporated by reference.

The following examples are presented in illustration of this invention and are not intended as undue limitations on the generally broad scope of the invention as set out in the appended claims.

The structure of the UZM-8 zeolites of this invention was determined by x-ray analysis. The x-ray patterns presented in the following examples were obtained using standard x-ray powder diffraction techniques. The radiation source was a high-intensity, x-ray tube operated at 45 kV and 35 ma. The diffraction pattern from the copper K-alpha radiation was obtained by appropriate computer based techniques. Flat compressed powder samples were either continuously scanned at 2° to 70° (2θ) or in a step mode from 4° to 35° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100%× $I/I_o$, the above designations are defined as $$w=0-15;\ m=15-60;\ s=60-80\ \text{and}\ vs=80-100$$

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

EXAMPLES

The following abbreviations will be used in the examples:
Al $(Oi-Pr)_3$—aluminum isopropoxide
Al $(Osec-Bu)_3$—aluminum tri-sec-butoxide
DEDMAOH—diethyldimethylammonium hydroxide
ETMAOH—ethyltrimethylammonium hydroxide
$HM(OH)_2$—hexamethonium dihydroxide
MTEAOH—methyltriethylammonium hydroxide
TEAOH—tetraethylammonium hydroxide
TEOS—tetraethylorthosilicate
TMACl—tetramethylammonium chloride
TPAOH—tetrapropylammonium hydroxide Example 1

This example illustrates how UZM-8 can be prepared in an alkali-free synthesis system from a homogenous solution. An aluminosilicate solution, designated Reagent A for this example, was prepared in the following manner. Al(Osec-Bu)$_3$ (97%), 4.63 g, was added to 159.63 g DEDMAOH (20% aq) with vigorous mixing, and to this reaction mixture there were added 189.78 g TEOS (98%) and 145.96 g deionized $H_2O$. The reaction mixture was homogenized for 2 hr with a high-speed mechanical stirrer, forming a homogenous aluminosilicate solution. This solution was then concentrated on a rotary evaporator, as the by-products of hydrolysis, ethanol and sec-butanol, and some water was removed. Elemental analysis of this aluminosilicate stock solution showed it to contain 7.86 wt. % Si and 0.16 wt. % Al.

Another aluminosilicate stock solution, designated Reagent B for this example, was prepared in the following manner. Al(Osec-Bu)$_3$ (97%), 60.91 g, was added to 280.00 g DEDMAOH (20% aq) with vigorous mixing, and to this mixture there were added 99.86 g TEOS (98%) and 59.23 g de-ionized H$_2$O. The reaction mixture was homogenized for 4.5 hr with a high-speed mechanical stirrer yielding a clear homogenous solution. Elemental analysis of the resulting aluminosilicate stock solution showed it to contain 3.54 wt. % Si and 1.80 wt. % Al.

A 79.59 g portion of Reagent A and a 15.63 g portion of Reagent B were combined and mixed well. With continuous mixing, 29.80 g DEDMAOH (20% aq) was added to the reaction mixture. The resulting solution was homogenized for 30 min before it was transferred to 2×125 mL Teflon™-lined autoclaves. The autoclaves were placed in an oven set at 150° C. and digested for 14 days and 19 days. The solid products were collected by centrifugation, washed with de-ionized water and dried at 95° C.

Powder x-ray diffraction analysis identified both of the isolated products as the material designated UZM-8. Characteristic lines in the diffraction pattern are shown in Table 1 below. Elemental analysis showed the product from the 14 day digestion to consist of the elemental mole ratios Si/Al=15.23, N/Al=1.55, and C/N=5.44. A portion of this material was calcined by ramping to 540° C. in N$_2$ for 4 hr followed by a 4 hr dwell in N$_2$. The stream was then switched to air and the sample was calcined for an additional 16 hr at 540° C. The BET surface area was found to be 472 m$^2$/g and the micropore volume was 0.11 cc/g.

TABLE 1

| 2-θ | d (Å) | I/I$_0$ % |
|---|---|---|
| 2.91 | 30.29 | m |
| 6.58 | 13.42 | m |
| 7.26 | 12.17 | m |
| 8.67 | 10.19 | s |
| 13.45 | 6.58 | w |
| 14.61 | 6.06 | w |
| 20.01 | 4.43 | vs |
| 22.36 | 3.97 | s |
| 25.06 | 3.55 | w |
| 26.02 | 3.42 | s |
| 26.86 | 3.32 | m |
| 31.72 | 2.82 | w |
| 33.44 | 2.68 | w |
| 37.86 | 2.37 | w |
| 46.42 | 1.95 | w |
| 48.61 | 1.87 | w |
| 51.90 | 1.76 | w |
| 65.48 | 1.42 | w |

Example 2

An aluminosilicate stock solution was prepared in the following manner. While mixing vigorously, 28.03 g of Al(Osec-Bu)$_3$ (97%) was added to 644.36 g DEDMAOH (20% aq). After mixing for 5 min, 324.76 g colloidal silica (Ludox™ AS-40, 40% SiO$_2$) was slowly added. A 2.85 g portion of deionized H$_2$O was then added. The mixture was homogenized for 20 min before transferring to two 1 L Teflon bottles. The Teflon bottles were placed in a 100° C. oven and the mixture was aged for 67 hr. After the aging step, the resulting clear aluminosilicate solutions were recombined and analyzed. Elemental analysis indicated this aluminosilicate stock solution contained 6.59 wt. % Si and 0.34 wt. % Al.

A 60.47 g portion of the above aluminosilicate solution was transferred to a Teflon-lined autoclave. The autoclave was placed in an oven set at 150° C. and the reaction mixture was digested for 7 days. The solid product was collected by centrifugation, washed with de-ionized water, and dried at room temperature.

The product was identified as UZM-8 by powder x-ray diffraction analysis. A listing of the x-ray diffraction lines characteristic of the sample are given below in Table 2. Elemental analysis showed the product to consist of the elemental mole ratios Si/Al=16.18, N/Al=2.14, and C/N=5.62. A portion of the material was calcined by ramping to 538° C. in N$_2$ for 3 hr followed by a 5 hr dwell in N$_2$. The stream was then switched to air and the sample was calcined an additional 16 hr at 538° C. The BET surface area was found to be 370 m$^2$/g and the micropore volume was 0.12 cc/g.

TABLE 2

| 2-θ | d (Å) | I/I$_0$ % |
|---|---|---|
| 7.22 | 12.24 | s |
| 8.58 | 10.30 | s |
| 20.01 | 4.43 | s |
| 22.29 | 3.99 | vs |
| 25.12 | 3.54 | m |
| 26.04 | 3.42 | vs |

Example 3

A 55.14 g portion of the aluminosilicate stock solution prepared in Example 2 was weighed into a beaker. Separately, 0.79 g TMACl was dissolved in 4.08 g de-ionized H$_2$O. This TMACl solution was added to the aluminosilicate solution and thoroughly mixed with a high-speed stirrer. The reaction mixture, which remained a solution, was then transferred to a Teflon-lined autoclave. The autoclave was placed in an oven set at 150° C. and the reaction mixture was digested for 7 days. The solid product was collected by centrifugation, washed with de-ionized water, and dried at room temperature.

Powder x-ray diffraction analysis showed the product to be the material designated UZM-8. Characteristic diffraction lines for the product are shown in Table 3. Elemental analyses showed the product to consist of the elemental mole ratios Si/Al=14.38, Na/Al=0.02, N/Al=2.02, and C/N=5.58. The sodium came from the silica source. A portion of the material was calcined by ramping to 538° C. in N$_2$ for 3 hr followed by a 5 hr dwell in N$_2$. The stream was then switched to air and the sample was calcined for an additional 16 hr at 538° C. The BET surface area was found to be 370 m$^2$/g and the micropore volume was 0.12 cc/g.

TABLE 3

| 2-θ | d (Å) | I/I$_0$ % |
|---|---|---|
| 3.04 | 29.00 | w |
| 6.68 | 13.22 | m |
| 7.22 | 12.23 | m |
| 8.70 | 10.16 | m |
| 14.63 | 6.05 | w |
| 19.98 | 4.44 | vs |

TABLE 3-continued

| 2-θ | d (Å) | I/I₀ % |
|---|---|---|
| 22.43 | 3.96 | vs |
| 25.03 | 3.55 | w |
| 26.02 | 3.42 | s |
| 26.57 | 3.35 | s |
| 31.55 | 2.83 | w |
| 33.35 | 2.68 | w |
| 37.74 | 2.38 | w |
| 46.33 | 1.96 | w |
| 48.80 | 1.86 | w |
| 51.81 | 1.76 | w |
| 65.46 | 1.42 | w |

Example 4

An aluminosilicate stock solution was prepared in the following manner. Al(Osec-Bu)$_3$ (97%), 6.44 g, was added to 151.18 g DEDMAOH (20% aq) with vigorous mixing. With continuous mixing, 161.76 g TEOS (98%) and 80.62 g deionized H$_2$O were added to the reaction mixture. The reaction mixture was homogenized for 1.5 hr with a high-speed mechanical stirrer. The solution was then concentrated with a rotary evaporator to remove some of the alkoxide hydrolysis products, ethanol and sec-butanol, and some water. Elemental analysis showed the aluminosilicate stock solution to contain 8.66 wt. % Si and 0.27 wt. % Al.

A 24.24 g portion of DEDMAOH (20% aq) was added to 43.69 g portion of the above aluminosilicate stock solution and mixed well. A solution comprised of 0.519 NaCl and 1.56 g deionized H$_2$O was prepared and added to the reaction mixture while mixing. The reaction mixture was homogenized for 40 min yielding a clear homogenous solution which was then transferred to a Teflon-lined autoclave, which was placed in an oven heated to 150° C. and the reaction mixture was digested for 7 days. The solid product was collected by centrifugation, washed with de-ionized water, and dried at 95° C.

Powder x-ray diffraction analysis indicated the product to be the material designated UZM-8. The characteristic diffraction lines for this sample are given in Table 4 below. Elemental analysis showed the product to consist of the elemental mole ratios Si/Al=23.91, Na/Al=0.42, N/Al=3.16 and C/N=5.46. A portion of the material was calcined by ramping to 540° C. in N$_2$ for 4 hr followed by a 4 hr dwell in N$_2$. The stream was then switched to air and the sample was held for an additional 6 hr at 540° C. The BET surface area was found to be 356 m$^2$/g and the micropore volume was 0.12 cc/g.

TABLE 4

| 2-θ | d (Å) | I/I₀ % |
|---|---|---|
| 3.08 | 28.62 | m |
| 6.68 | 13.22 | m |
| 7.21 | 12.25 | m |
| 8.76 | 10.08 | m |
| 14.70 | 6.02 | w |
| 20.11 | 4.41 | m |
| 22.52 | 3.94 | vs |
| 25.14 | 3.54 | m |
| 26.06 | 3.42 | m–s |
| 26.86 | 3.32 | m |
| 29.09 | 3.07 | m |
| 33.44 | 2.68 | w |
| 46.31 | 1.96 | w |

TABLE 4-continued

| 2-θ | d (Å) | I/I₀ % |
|---|---|---|
| 48.44 | 1.88 | w |
| 65.56 | 1.42 | w |

Example 5

An aluminosilicate reaction mixture was prepared in the following manner. Al(Osec-Bu)$_3$ (97%), 66.51 g, was added to 918.29 g of DEDMAOH, (20% aq) with vigorous stirring. To this mixture, 208.95 g precipitated silica, (Ultrasil™ VN SP3, 89% SiO$_2$) was added with continuous mixing. A solution of 37.2 g Na$_2$SO$_4$ in 169.05 g deionized H$_2$O was prepared and added to the previous mixture and homogenized for 10 min. A 1.7 g portion of UZM-8 seed was added to the mixture, followed by an additional 20 min of mixing. A 1077.3 g portion of this final reaction mixture was transferred to a 2-L Teflon-lined autoclave. The autoclave was placed in an oven set at 150° C. and the reaction mixture was digested quiescently for 10 days. The solid product was collected by filtration, washed with de-ionized water, and dried at 95° C.

The product was identified as UZM-8 by powder x-ray diffraction analysis. Table 5 below shows the characteristic diffraction lines for the product. Elemental analysis revealed the composition of the isolated product to consist of the elemental mole ratios Si/Al=9.96, Na/Al=0.26, N/Al=1.23, and C/N=4.83. A portion of the material was calcined by ramping to 538° C. in N$_2$ for 3 hr followed by a 4 hr dwell in N$_2$. The stream was then switched to air and the sample was calcined for another 15 hr at 538° C. The calcined sample was then ammonium ion-exchanged to remove the alkali cations. The sample was then reactivated by heating to 500° C. in air and holding at that temperature for 2 hr. The BET surface area was found to be 343 m$^2$/g and the micropore volume was 0.14 cc/g.

TABLE 5

| 2-θ | d (Å) | I/I₀ % |
|---|---|---|
| 3.00 | 29.39 | s |
| 6.71 | 13.17 | m |
| 7.16 | 12.34 | m |
| 8.52 | 10.37 | vs |
| 13.06 | 6.77 | w |
| 14.39 | 6.15 | w |
| 15.80 | 5.60 | w |
| 20.01 | 4.43 | m |
| 22.18 | 4.00 | vs |
| 25.03 | 3.55 | m |
| 25.98 | 3.43 | vs |
| 26.95 | 3.31 | m |
| 28.87 | 3.09 | w–m |
| 31.43 | 2.84 | w |
| 33.35 | 2.68 | w |
| 37.65 | 2.39 | w |
| 44.50 | 2.03 | w |
| 46.15 | 1.97 | w |
| 46.36 | 1.96 | w |
| 48.43 | 1.88 | w |
| 51.64 | 1.77 | w |
| 61.04 | 1.52 | w |
| 65.34 | 1.43 | w |

Example 6

An aluminosilicate stock solution was prepared in the following manner. Al(Osec-Bu)$_3$ (95+%), 17.28 g, was added to 719.57 g ETMAOH (12.8%) with vigorous stirring. To this mixture, 260.12 g colloidal silica, (Ludox AS-40, 40% SiO$_2$) was added, followed by the addition of 3.03 g distilled water. The reaction mixture was homogenized for ½ hr with a high-speed mechanical stirrer, and then aged in Teflon bottles overnight at 98° C. After the aging step, the reaction mixture was a homogenous clear solution. Elemental analysis indicated the aluminosilicate stock solution had a silicon content of 4.93 wt. % and 0.22 wt. % Al.

With vigorous mixing, a 154.21 g portion of the above reaction mixture was combined with absolution consisting of 3.67 g NaCl and 52.11 g de-ionized H$_2$O. The reaction mixture was homogenized for 25 min with a high-speed mechanical stirrer. A 188.86 g portion of the above reaction mixture was distributed among three 125 mL Teflon-lined autoclaves. The autoclaves were placed in an oven set at 150° C. and the reaction mixtures digested for 7 days. The solid products were collected by centrifugation, washed with de-ionized water, and dried at 95° C.

Powder x-ray diffraction analysis showed that all three products exhibited the lines characteristic of the material designated UZM-8. Based on the similarity of the diffraction patterns, the three samples were combined. Characteristic diffraction lines for the products are shown in Table 6. Elemental analyses showed the composite sample to consist of the elemental mole ratios Si/Al=12.97, Na/Al=0.37, N/Al=1.77, and C/N=4.92. A portion of this material was ammonium ion-exchanged to remove the alkali cations. That material was then calcined by ramping to 540° C. in N$_2$ for 4 hr followed by a 4 hr dwell in N$_2$. The stream was then switched to air and the sample was held for an additional 15 hr at 540° C. The BET surface area was found to be 360 m$^2$/g and the micropore volume was 0.14 cc/g.

TABLE 6

| 2-θ | d (Å) | I/I$_0$ % |
|---|---|---|
| 3.19 | 27.69 | w |
| 6.70 | 13.19 | s |
| 7.16 | 12.33 | m |
| 8.90 | 9.93 | w |
| 13.37 | 6.61 | w |
| 14.58 | 6.07 | w |
| 20.06 | 4.42 | vs |
| 22.41 | 3.96 | m |
| 25.06 | 3.55 | w |
| 26.04 | 3.42 | s |
| 26.59 | 3.35 | m |
| 29.28 | 3.05 | w |
| 33.58 | 2.67 | w |
| 37.90 | 2.37 | w |
| 44.77 | 2.02 | w |
| 46.25 | 1.96 | w |
| 48.60 | 1.87 | w |
| 51.90 | 1.76 | w |
| 65.34 | 1.43 | w |

Example 7

An aluminosilicate reaction mixture was prepared in the following manner. Al(Osec-Bu)$_3$ (97%), 8.11 g, was added to 133.22 g DEDMAOH (20% aq) with vigorous mixing. With continuous mixing, 43.30 g precipitated silica (Ultrasil VN SP3, 89% SiO$_2$) was added. Separately, 1.19 g KCl and 3.61 g TMACl were dissolved in 10.56 g de-ionized H$_2$O. The salt solution was then added to the aluminosilicate reaction mixture. The reaction mixture was homogenized for 15 min with a high-speed mechanical stirrer. A 46.4 g portion of the reaction mixture was transferred to a 100 mL Parr stainless steel stirred autoclave. The autoclave was heated to 150° C. and maintained at that temperature for 145 hr with continuous stirring. The resultant solid product was collected by centrifugation, washed with de-ionized water, and dried at 95° C.

Powder x-ray diffraction analysis identified the product as the material designated UZM-8. Characteristic lines in the diffraction pattern of this sample are given in Table 7 below. Elemental analysis showed the product to consist of the elemental mole ratios Si/Al=16.34, K/Al=0.14, N/Al=1.88. A portion of the material was calcined by ramping to 540° C. in N$_2$ for 4 hr followed by a 4 hr dwell in N$_2$. The stream was then switched to air and the sample was held for an additional 16 hr at 540° C. The BET surface area was found to be 283 m$^2$/g and the micropore volume was 0.08 cc/g.

TABLE 7

| 2-θ | d (Å) | I/I$_0$ % |
|---|---|---|
| 6.55 | 13.49 | w |
| 7.13 | 12.38 | m |
| 8.64 | 10.23 | m |
| 20.01 | 4.43 | s |
| 22.47 | 3.95 | vs |
| 25.04 | 3.55 | w |
| 25.94 | 3.43 | m |
| 26.61 | 3.35 | w |

Example 8

An aluminosilicate stock solution was prepared in the following manner. With vigorous mixing, 28.03 g of Al(Osec-Bu)$_3$ (97%) was added to 644.36 g DEDMAOH (20% aq). After mixing for 5 min, 324.76 g colloidal silica (Ludox AS-40, 40 wt. % SiO$_2$) was slowly added. A 2.85 g portion of de-ionized H$_2$O was then added. The mixture was homogenized for 20 min before transferring to two 1 L Teflon bottles. The Teflon bottles were placed in a 100° C. oven and the mixture was aged for 67 hr. After the aging step, the reaction mixture was a homogenous clear solution. Elemental analysis indicated the aluminosilicate stock solution contained 6.59 wt. % Si and 0.34 wt. % Al.

A solution comprised of 1.31 g TMACl, 0.25 g LiCl and 6.78 g deionized H$_2$O was prepared. This salt solution was added to a 91.67 g portion of the aluminosilicate stock solution prepared above. The resulting mixture was homogenized for 15 min before transferring a 19.87 g portion to a Teflon-lined autoclave. The autoclave was placed in an oven set at 150° C. and the reaction mixture digested for 7 days. The solid product was collected by centrifugation, washed with de-ionized water and dried at room temperature.

Powder x-ray diffraction analysis indicated the product to be the material designated UZM-8. Characteristic diffraction lines for the product are given below in Table 8. Elemental analyses showed the product to consist of the elemental mole ratios Si/Al=16.22, Li/Al=0.31, N/Al=3.52 and C/N=5.54. A portion of the material was calcined by ramping to 540° C. in N$_2$ for 4 hr followed by a 4 hr dwell in N$_2$. The stream was then switched to air and the sample was calcined for an additional 16 hr at 540° C. The BET surface area was found to be 403 m$^2$/g and the micropore volume was 0.15 cc/g.

TABLE 8

| 2-θ | d (Å) | I/I₀ % |
| --- | --- | --- |
| 3.06 | 28.82 | s |
| 6.70 | 13.19 | s |
| 7.21 | 12.26 | s |
| 8.80 | 10.04 | m |
| 13.55 | 6.53 | w |
| 14.74 | 6.00 | w |
| 20.01 | 4.43 | vs |
| 22.46 | 3.96 | vs |
| 25.06 | 3.55 | m |
| 26.04 | 3.42 | m |
| 26.81 | 3.32 | w |
| 29.08 | 3.07 | w |
| 33.53 | 2.67 | w |
| 46.27 | 1.96 | w |
| 48.66 | 1.87 | w |
| 51.83 | 1.76 | w |
| 65.34 | 1.43 | w |

Example 9

An aluminosilicate stock solution mixture was prepared in the following manner. In a beaker, 187.87 g DEDMAOH (20% aq) was combined with 209.98 g MTEAOH hydroxide (20% aq). While mixing vigorously, 12.81 g Al(Osec-Bu)₃ (97%) was added to the beaker. With continuous mixing, 189.37 g colloidal silica (Ludox AS-40, 40 wt. % SiO₂) was added. The reaction mixture was homogenized for 30 min before transferring to a 1 L Teflon bottle. The Teflon bottle was placed in a 95° C. oven and the reaction mixture was aged for 66 hr. at 95° C. After the aging step the reaction mixture was a clear homogenous solution. Elemental analysis indicated that this aluminosilicate stock solution contained 6.06 wt. % Si and 0.24 wt. % Al.

A solution comprised of 2.87 g NaCl and 8.80 g deionized H₂O was added to a 113.32 g portion of the aluminosilicate stock solution. The reaction mixture was then homogenized for 20 min with a high-speed stirrer. A 20.59 g portion of the reaction mixture was transferred to a Teflon-lined autoclave. The autoclave was placed in an oven set at 150° C. and the reaction mixture was digested for 10 days. The solid product was collected by centrifugation, washed with de-ionized water, and dried at 95° C.

Powder x-ray diffraction analysis indicated the product to be the material designated UZM-8. Characteristic diffraction lines for the product are listed in Table 9 below. Elemental analysis showed the product consisted of the elemental mole ratios Si/Al=17.63, Na/Al=1.82, N/Al=2.86 and C/N=7.19. A portion of this material was ammonium ion-exchanged to remove the alkali cations. That material was then calcined by ramping to 540° C. in N₂ for 4 hr followed by a 4 hr dwell in N₂. The stream was then switched to air and the sample was calcined for an additional 15 hr at 540° C. The BET surface area was found to be 328 m²/g and the micropore volume was 0.12 cc/g.

TABLE 9

| 2-θ | d (Å) | I/I₀ % |
| --- | --- | --- |
| 2.86 | 30.91 | vs |
| 6.63 | 13.32 | w |
| 7.14 | 12.37 | m |
| 8.77 | 10.08 | w–m |
| 13.54 | 6.54 | w |
| 14.75 | 6.00 | w |
| 16.11 | 5.50 | w |
| 19.89 | 4.46 | vs |
| 22.42 | 3.96 | s |
| 25.00 | 3.56 | m |
| 25.96 | 3.43 | s |
| 26.60 | 3.35 | m |
| 33.19 | 2.70 | w |
| 37.80 | 2.38 | w |
| 46.13 | 1.97 | w |
| 51.80 | 1.76 | w |
| 65.25 | 1.43 | w |

Example 10

An aluminosilicate stock solution was prepared in the following manner. With vigorous mixing, 13.75 g of Al(Osec-Bu)₃ (97%) was added to 221.27 g DEDMAOH (20% aq). After mixing for 5 min, 159.31 g colloidal silica (Ludox AS-40, 40% SiO₂) was slowly added. A 5.669 portion of de-ionized H₂O was then added. The mixture was homogenized for 20 min before transferring to a 1 L Teflori bottle. The Teflon bottle was placed in a 100° C. oven and the mixture was aged for 41 hr. After the aging step, the reaction mixture was a clear homogenous solution. Elemental analysis indicated the aluminosilicate stock solution contained 8.45 wt. % Si and 0.44 wt. % Al.

A 56.65 g portion of the above aluminosilicate stock solution was weighed into a beaker. Separately, a solution comprised of 0.779 CsCl, 1.04 g TMACl and 1.53 g de-ionized H₂O was prepared. While stirring, the salt solution was added to the aluminosilicate solution. The reaction mixture was homogenized for 20 min before transferring a 20.01 g portion to a Teflon-lined autoclave. The autoclave was placed in an oven set at 175° C. and the reaction mixture digested for 7 days. The solid product was collected by centrifugation, washed with de-ionized water and dried at room temperature.

Powder x-ray diffraction indicated the product to be the material designated UZM-8. Characteristic diffraction lines for the product are listed in Table 10. Elemental analysis showed the product to consist of the elemental mole ratios Si/Al=18,2, Cs/Al=0.35, N/Al=2.48 and C/N=4.98.

TABLE 10

| 2-θ | d (Å) | I/I₀ % |
| --- | --- | --- |
| 7.26 | 12.17 | m |
| 8.72 | 10.13 | w |
| 19.94 | 4.45 | s |
| 22.53 | 3.94 | vs |
| 25.02 | 3.56 | w |
| 26.08 | 3.41 | m |
| 26.79 | 3.32 | m |

Example 11

An aluminosilicate stock solution was prepared by adding 15.39 g of Al(Osec-Bu)₃ (95+%) to a combination of 99.79 g of a TPAOH solution (40%) and 349.93 g of a DEDMAOH solution (20%) with vigorous stirring. This was followed by the addition of 235.18 g of colloidal silica, (Ludox AS-40, 40% SiO₂). The reaction mixture was homogenized for 50 minutes with a high-speed mechanical stirrer, and then aged in a Teflon bottle overnight at 95° C. After the aging step, the reaction mixture was a clear, homogenous solution. Elemental analysis indicated the aluminosilicate stock solution contained 6.35 wt. % Si.

A 159.39 g portion of the aluminosilicate stock solution prepared above was treated with a solution consisting of 4.15 g of NaCl dissolved in 16.50 g distilled water while mixing vigorously. After 20 min of homogenization, the reaction mixture was distributed among 6 Teflon-lined autoclaves and two Teflon bottles. The reaction mixtures in the autoclaves were reacted at 125° C. and 150° C. for 10 and 14 days and at 175° C. for 3 and 7 days and the mixtures in the bottles were reacted at 100° C. for 14 and 21 days. All reactions were carried out at autogenous pressures. The solid products were isolated by centrifugation, washed with de-ionized water, and dried at 50° C.

The product of the reaction at 125° C. for 14 days exhibited the x-ray diffraction pattern of UZM-8. Representative diffraction lines for this product are listed in Table 11. Elemental analysis of the same product indicated the elemental mole ratios of Si/Al=12.57; Na/Al=0.37; N/Al=1.79; and C/N=7.37. A portion of the product was calcined under a flow of nitrogen for 4 hours at 540° C. and then in air for an additional 16 hours at 540° C. The calcined product had a BET surface area of 391 $m^2/g$ and a micropore volume of 0.11 cc/g.

TABLE 11

| 2-θ | d (Å) | I/I$_0$ % |
| --- | --- | --- |
| 6.53 | 13.54 | m |
| 7.11 | 12.43 | m |
| 8.58 | 10.30 | vs |
| 13.06 | 6.77 | w |
| 14.55 | 6.08 | w |
| 19.88 | 4.46 | s–vs |
| 22.35 | 3.97 | s |
| 24.90 | 3.57 | w |
| 25.89 | 3.44 | vs |
| 26.96 | 3.30 | m |
| 33.09 | 2.71 | w |
| 37.75 | 2.38 | w |
| 46.26 | 1.96 | w |
| 48.68 | 1.87 | w |
| 51.81 | 1.76 | w |
| 65.26 | 1.43 | w |

Example 12

An aluminosilicate stock solution was prepared by adding 15.16 g of Al(Osec-Bu)$_3$ (95+%) to a mixture of 396.02 g DEDMAOH solution (20%) and 56.43 g TPAOH solution (40%) with vigorous stirring. Next, 232.87 g colloidal silica (Ludox AS-40, 40% SiO$_2$) was added and the reaction mixture was homogenized for another 1.5 hours. This mixture was aged overnight in a Teflon bottle at 95° C. After the aging step, the reaction mixture was a clear, homogenous solution. Elemental analysis indicated the aluminosilicate stock solution contained 6.34 wt. % Si.

A portion of this aluminosilicate stock solution, 125.26 g, was treated with a NaCl solution (3.27 g NaCl in 11.48 g water) while mixing vigorously. After homogenization, a portion of the resulting mixture was transferred to a Teflon-lined autoclave and digested at 125° C. for 14 days. The solid product was recovered by centrifugation, washed with de-ionized water, and dried at 50° C.

Powder X-ray diffraction indicated the product formed to be UZM-8. Representative diffraction lines for the product are given in Table 12 below. Elemental analyses indicated the product to consist of the elemental mole ratios Si/Al=13.60; Na/Al=0.80; N/Al=3.02; and C/N=7.82. A portion of the product was calcined under a flow of nitrogen for 4 hours at 540° C. and then in air for an additional 16 hours at 540° C. The calcined product had a BET surface area of 312 $m^2/g$ and a micropore volume of 0.10 cc/g.

TABLE 12

| 2-θ | d (Å) | I/I$_0$ % |
| --- | --- | --- |
| 2.86 | 30.87 | w |
| 6.40 | 13.80 | m |
| 7.08 | 12.48 | m |
| 8.58 | 10.30 | vs |
| 12.73 | 6.95 | w |
| 14.74 | 6.01 | m |
| 19.80 | 4.48 | vs |
| 22.20 | 4.00 | vs |
| 24.94 | 3.57 | m |
| 25.88 | 3.44 | vs |
| 26.86 | 3.32 | m–s |
| 33.26 | 2.69 | w |
| 36.31 | 2.47 | w |
| 37.66 | 2.39 | w |
| 46.16 | 1.97 | w |
| 48.43 | 1.88 | w |
| 51.90 | 1.76 | w |
| 65.34 | 1.43 | w |

Example 13

To 102.89 g of the same aluminosilicate stock solution employed in example 12, a NaCl solution (2.67 g NaCl in 9.42 g water) was added with vigorous stirring. The resulting mixture was transferred to six Teflon™-lined autoclaves and the mixtures reacted at 115° C. for 4, 10, 15, 20, and 25 days. The solid products were recovered by centrifugation, washed with de-ionized water, and dried at 60° C.

The product formed at 115° C. for 25 days was identified as UZM-8 by powder x-ray diffraction. Representative diffraction lines in the pattern are given in Table 13. The sample was analyzed and found to have elemental mole ratios of Si/Al=11.31; Na/Al=0.95; N/Al=3.03; and C/N=7.85. A portion of the product was calcined under a flow of nitrogen for 4 hours at 540° C. and then in air for 16 hours at 540° C., and then characterized by nitrogen adsorption. The BET surface area was 355 $m^2/g$ and the micropore volume was 0.091 cc/g.

TABLE 13

| 2-θ | d (Å) | I/I$_0$ % |
| --- | --- | --- |
| 7.04 | 12.55 | w |
| 8.45 | 10.40 | m |
| 19.97 | 4.44 | m |
| 22.25 | 3.99 | vs |
| 24.85 | 3.58 | w |
| 25.78 | 3.45 | vs |

Example 14

A Na gallate solution (9.91% Ga, 6.31% Na) was prepared. A 4.78 g portion of the Na gallate solution was combined with 44.84 g DEDMAOH (20% aq) and mixed with a mechanical stirrer. With continuous mixing, 19.58 g Ludox AS-40 and 0.80 g deionized H$_2$O were added to the reaction mixture. The reaction mixture was mixed for 20 min and then transferred to a 125 mL Teflon-lined autoclave. The autoclave was placed in an oven set at 150° C. and digested for 10 days at autogenous pressure. The solid product was collected by filtration, washed and dried at 95° C.

Characterization by powder x-ray diffraction identified the product as UZM-8. Characteristic diffraction lines for the product are given in table 14. By elemental analysis, it was determined that the material consisted of the elemental mole ratios Si/Ga=12.65, Na/Ga=0.14, N/Ga=1.38, and C/N=5.7. A portion of this material was ammonium ion-exchanged to remove the alkali cations. That material was then calcined by ramping to 540° C. in $N_2$ for 4 hr followed by a 4 hr dwell in $N_2$. The stream was then switched to air and the sample was held 16 hr at 540° C. in air. The BET surface area was found to be 333 m²/g and the micropore volume was 0.14 cc/g.

TABLE 14

| 2-θ | d (Å) | I/I$_0$ % |
|---|---|---|
| 3.12 | 28.31 | vs |
| 6.68 | 13.22 | s |
| 7.12 | 12.41 | vs |
| 8.63 | 10.24 | m |
| 12.81 | 6.90 | w |
| 15.78 | 5.61 | w |
| 19.96 | 4.45 | s |
| 22.24 | 3.99 | s |
| 24.98 | 3.56 | m |
| 25.92 | 3.43 | vs |
| 26.60 | 3.35 | m |
| 29.02 | 3.07 | w |
| 31.49 | 2.84 | w |
| 33.37 | 2.68 | m |
| 36.26 | 2.48 | w |
| 37.67 | 2.39 | w |
| 44.67 | 2.03 | w |
| 46.21 | 1.96 | w |
| 48.48 | 1.88 | w |
| 51.90 | 1.76 | w |
| 65.22 | 1.43 | w |

Example 15

A first aluminosilicate stock solution was prepared by dissolving 34.76 g of aluminum sec-butoxide (95$^+$%) in 337.83 g hexamethonium dihydroxide solution (19.75%), followed by the addition of 360.24 g de-ionized water while stirring vigorously. Then 300.0 g of tetraethylorthosilicate (98%) was added and the resulting mixture homogenized for 2 hours with a high-speed mechanical stirrer. The resulting solution was transferred to a rotary evaporator to remove alcohol from the hydrolysis of the alkoxides and sent for analysis after cooling. The analysis indicated a Si content of 5.27 wt. %.

A second aluminosilicate stock solution was prepared by dissolving 9.93 g of aluminum sec-butoxide (95$^+$%) in 295.59 g hexamethonium dihydroxide (19.75%) solution, followed by the addition of 413.46 g de-ionized water while stirring vigorously. Then 300.0 g of tetraethylorthosilicate (98%) was added and the resulting mixture homogenized for 2 hours with a high-speed mechanical stirrer. The resulting solution was transferred to a rotary evaporator to remove alcohol from the hydrolysis of the alkoxides and sent for analysis after cooling. The analysis indicated a Si content of 5.51 wt. %.

The synthesis of the zeolite was carried out as follows. A volume of 694 μL of the first aluminosilicate stock solution was pipetted to a teflon reactor. Next, a volume of 356 μL of the second aluminosilicate stock solution was pipetted to the same teflon reactor while mixing on an orbital shaker. Next 20 μL of hexamethonium dihydroxide solution (19.75%) were added, followed by 30 μL of strontium nitrate solution (22.7%). The teflon reactor was then sealed and the reaction mixture homogenized vigorously for an hour and then inserted into an autoclave which was placed into an oven for 120 hours at 175° C. The resulting product was washed, centrifuged, and dried overnight at 75° C.

The x-ray diffraction pattern exhibited the lines characteristic of the material designated UZM-8. Characteristic lines in the diffraction pattern are given in Table 15.

TABLE 15

| 2-θ | d (Å) | I/I$_0$ % |
|---|---|---|
| 6.50 | 13.59 | vs |
| 7.05 | 12.53 | m |
| 8.67 | 10.19 | m |
| 12.80 | 6.91 | w |
| 14.61 | 6.06 | w |
| 20.00 | 4.44 | s |
| 22.05 | 4.03 | m |
| 24.95 | 3.57 | m |
| 25.95 | 3.43 | s |
| 26.65 | 3.34 | m |
| 33.51 | 2.67 | w |

Example 16

Figure 1B:
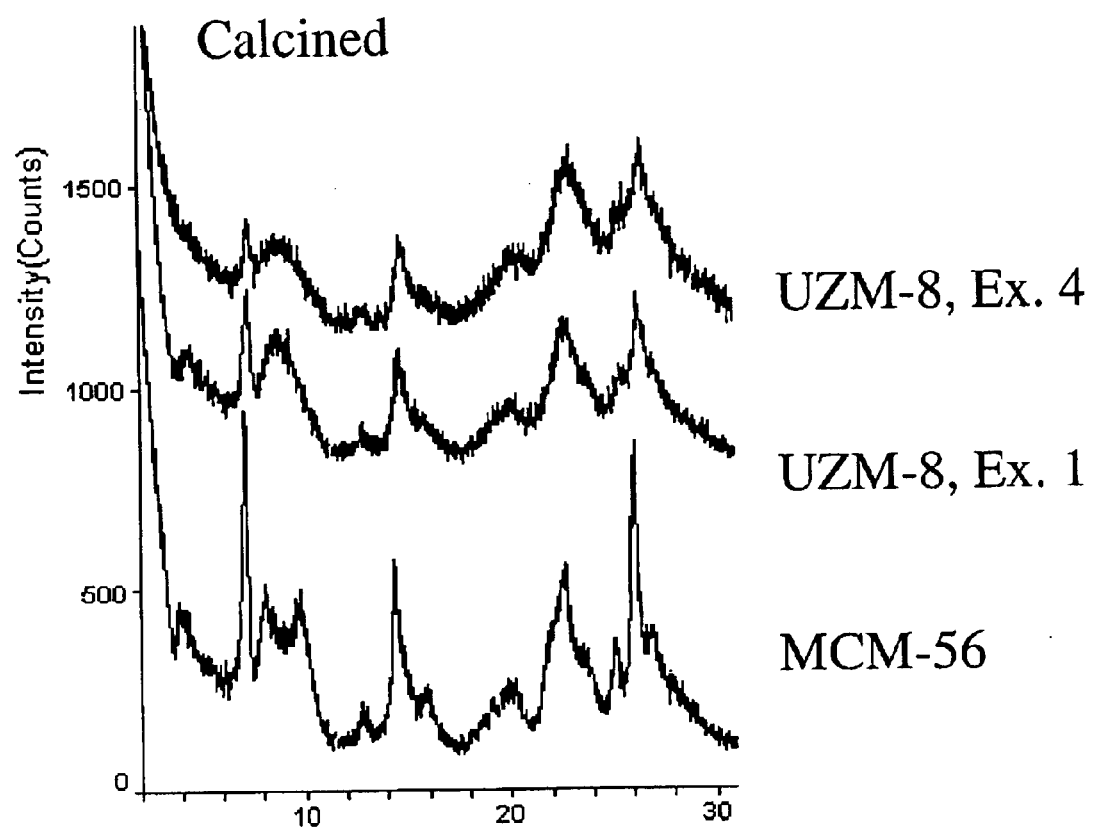
FIG. 1b presents x-ray diffraction patterns for calcined UZM-8 compositions of examples 1 and 4, and for zeolite MCM-56.

This example presents a comparison of MCM-56 versus UZM-8, both as-synthesized and calcined. MCM-56 was prepared according to example 8 of U.S. Pat. No. 5,827,491. A sample withdrawn at 60 hrs was washed dried and calcined at 540° C. for 4 hr in $N_2$ and 16 hr in air. The UZM-8 samples from examples 1 and 4 were also calcined using the same program. The diffraction lines for each of the calcined samples are given below in Table 16. FIG. 1a shows the x-ray diffraction patterns for three as-synthesized samples, while the diffraction patterns for the corresponding calcined patterns are shown in FIG. 1b. Both the Figures and Table 16 show that UZM-8 has a different diffraction pattern and thus a different structure from MCM-56.

TABLE 16

Calcined MCM-56 and UZM-8

| MCM-56 | | | Example 1 | | | Example 4 | | |
|---|---|---|---|---|---|---|---|---|
| 2-θ | d (Å) | I/I$_0$ % | 2-θ | d (Å) | I/I$_0$ % | 2-θ | d (Å) | I/I$_0$ % |
| 4.10 | 21.52 | m | 4.38 | 20.17 | m | | | |
| 7.10 | 12.44 | vs | 7.28 | 12.14 | m | 7.34 | 12.03 | m |
| 8.04 | 10.98 | m | 8.76 | 10.08 | s | 8.91 | 9.92 | m |
| 9.76 | 9.06 | vs | | | | | | |
| 12.69 | 6.97 | w | 12.79 | 6.92 | w | 12.84 | 6.89 | w |
| 14.34 | 6.17 | vs | 14.60 | 6.06 | vs | 14.70 | 6.02 | vs |
| 15.89 | 5.57 | m | 16.08 | 5.51 | w | 15.88 | 5.58 | w |
| 19.93 | 4.45 | m | 19.91 | 4.46 | m | 20.19 | 4.40 | w |
| 22.56 | 3.94 | vs | 22.66 | 3.92 | s | 22.82 | 3.89 | vs |
| 23.56 | 3.77 | m | 25.35 | 3.51 | w | | | |
| 25.00 | 3.56 | m | | | | | | |
| 26.04 | 3.42 | vs | 26.31 | 3.38 | m | 26.40 | 3.37 | vs |
| 26.88 | 3.31 | m | 27.04 | 3.31 | m | | | |

Example 17

UZM-8, MCM-56, and MCM-22 were compared in decane hydroconversion tests. The UZM-8 used was prepared by the procedure given in Example 5 above, the MCM-56 was prepared according to Example 1 of U.S. Pat. No. 5,362,697, while MCM-22 was prepared according to Example 4 of U.S. Pat. No. 4,954,325, except that the digestion time in the autoclave was shortened to 99 hr at 143° C. The samples were ammonium exchanged, calcined, and impregnated with a suitable amount of tetraamineplatinum dichloride to yield 1 wt. % Pt concentration on the final catalyst. The impregnated zeolites were then screened to 40–60 mesh. The meshed catalysts were calcined by ramping to 250° C. at 1° C./min and held there for 2 hr. The test was carried out in a high pressure microreactor operating at atmospheric pressure using 500 mg of the meshed samples. The samples were pretreated in a $H_2$ stream for 2 hr at 300° C. The feed consisted of 100:1 $H_2$/decane and the test was conducted over the temperature range from 130° C. to 260° C. at a 10° C./min ramp rate. Products were analyzed via online GC. The data is summarized in the Table 17 below.

TABLE 17

Comparison of MCM-22, MCM-56, and UZM-8 in Decane Conversion Tests

| Sample | Constant Temperature T = 250° C. | | | Constant $C_{10}$ Conversion (49%) | | Constant $C_{10}$ Conversion (44%) | |
|---|---|---|---|---|---|---|---|
| | Ex. 5 | MCM-56 | MCM-22 | Ex. 5 | MCM-56 | Ex. 5 | MCM-22 |
| Temp | 250° C. | 250° C. | 250° C. | 218° C. | 216° C. | 215° C. | 208° C. |
| $C_{10}$ Conv. | 97.7% | 98.9% | 99.8% | 49% | 49% | 44% | 44% |
| $MeC_9$ Isomers | 19.0% | 11.7% | 2.3% | 29.5% | 28.4% | 27.1% | 20.7% |
| $EtC_8$ Isomers | 4.1% | 3.2% | 1.5% | 2.1% | 1.9% | 1.8% | 1.0% |
| Mono-branched $C_{10}$ isomers | 23.1% | 15.0% | 3.8% | 31.6% | 30.3% | 28.9% | 21.7% |
| Di-branched $C_{10}$ isomers | 10.2% | 9.2% | 2.5% | 3.2% | 4.0% | 2.6% | 4.8% |
| $C_{10}$ isomers | 33.3% | 24.2% | 6.3% | 34.7% | 34.3% | 31.5% | 26.5% |
| Cracked products | 64.5% | 74.7% | 93.5% | 14.5% | 15.3% | 13% | 17.8% |

It is easily seen in the table that UZM-8 is not quite as active as MCM-56 or MCM-22, as the decane conversion is lowest for UZM-8 at constant temperature. The order of activity is MCM-22>MCM-56>UZM-8. The temperatures required to achieve matching conversion for UZM-8 and the other materials is always higher for UZM-8, again confirming the lower activity. However, it is also seen that UZM-8 favors isomerization vs. MCM-56 and MCM-22. The constant temperature results at 250° C. for UZM-8 show significantly more isomerization than either MCM-22 or MCM-56, both of which tend to do a lot more cracking. Direct comparisons at constant conversion also shows UZM-8 tends to do more overall isomerization and less cracking than either MCM-56 or MCM-22. Interestingly, while the overall isomerization for UZM-8 is highest among the three materials at constant conversion, UZM-8 formed more mono-branched decane isomers than either MCM-22 or MCM-56, while at the same time MCM-56 and MCM-22 formed more di-branched decane isomers than UZM-8. Hence, UZM-8 has different catalytic properties than both MCM-22 and MCM-56.

We claim as our invention:

1. A microporous crystalline zeolite having a layered framework of at least $AlO_2$ and $SiO_2$ tetrahedral units and a composition on an as-synthesized and anhydrous basis expressed by an empirical formula of:

$$M_m^{n+}R_r^{p+}Al_{1-x}E_xSi_yO_z$$

where M is at least one exchangeable cation selected from the group consisting of alkali and alkaline earth metals, "m" is the mole ratio of M to (Al+E) and varies from 0 to about 2.0, R is at least one organoammonium cation selected from the group consisting of quaternary ammonium cations, diquaternary ammonium cations, protonated amines, protonated diamines, protonated alkanoamines and quaternized alkanolammonium cations, "r" is the mole ratio of R to (Al+E) and has a value of about 0.05 to about 5.0, "n" is the weighted average valence of M and has a value of about 1 to about 2, "p" is the weighted average valence of R and has a value of about 1 to about 2, E is an element selected from the group consisting of gallium, iron, boron, chromium, indium and mixtures thereof, "x" is the mole fraction of E and has a value from 0 to about 1.0, "y" is the mole ratio of Si to (Al+E) and varies from about 6.5 to about 35 and "z" is the mole ratio of O to (Al+E) and has a value determined by the equation:

$$z=(m·n+r·p+3+4·y)/2$$

and is characterized in that it has the x-ray diffraction pattern having at least the d spacings and intensities set forth in Table A:

TABLE A

| 2-θ | d (Å) | $I/I_0$ % |
|---|---|---|
| 6.40–6.90 | 13.80–12.80 | w–s |
| 6.95–7.42 | 12.70–11.90 | m–s |
| 8.33–9.11 | 10.60–9.70 | w–vs |
| 19.62–20.49 | 4.52–4.33 | m–vs |
| 21.93–22.84 | 4.05–3.89 | m–vs |
| 24.71–25.35 | 3.60–3.51 | w–m |
| 25.73–26.35 | 3.46–3.38 | m–vs |

2. The zeolite of claim 1 where the zeolite is thermally stable up to a temperature of about 600° C.

3. The zeolite of claim 1 where M is selected from the group consisting of lithium, sodium, cesium, strontium, barium and mixtures thereof.

4. The zeolite of claim 1 where M is a mixture of an alkali metal and an alkaline earth metal.

5. The zeolite of claim 1 where R is selected from the group consisting of diethyldimethylammonium, ethyltrimethylammonium, hexamethonium and mixtures thereof.

6. The zeolite of claims 1 where R is not cyclic compound or does not contain a cyclic group as one of its substituents.

7. The zeolite of claim 1 where "m" is zero.

8. The zeolite of claim 6 where R is selected from the group consisting of diethyldimethylammonium, ethyltrimethylammonium, hexamethonium and mixtures thereof.

9. The zeolite of claim 1 where R is a mixture of diethyldimethyl ammonium and a quaternary amonium cation.

10. The zeolite of claim 1 where R is a mixture of ethyltrimethyl ammonium and a quaternary ammonium cation.

11. The zeolite of claim 1 where R is a mixture of hexamethonium and a quaternary ammonium cation.

12. A process for preparing a microporous crystalline zeolite having a layered framework of at least $AlO_2$ and $SiO_2$ tetrahedral units and a composition on an as-synthesized and anhydrous basis expressed by an empirical formula of:

$$M_m^{n+}R_r^{p+}Al_{1-x}E_xSi_yO_z$$

where M is at least one exchangeable cation selected from the group consisting of alkali and alkaline earth metals, "m" is the mole ratio of M to (Al+E) and varies from 0 to about 2.0, R is at least one organoammonium cation selected from the group consisting of quaternary ammonium cations, diquaternary ammonium cations, protonated amines, protonated diamines, protonated alkanoamines and quaternized alkanolammonium cations, "r" is the mole ratio of R to (Al+E) and has a value of about 0.05 to about 5.0, "n" is the weighted average valence of M and has a value of about 1 to about 2, "p" is the weighted average valence of R and has a value of about 1 to about 2, E is an element selected from the group consisting of gallium, iron, boron, chromium, indium and mixtures thereof, "x" is the mole fraction of E and has a value from 0 to about 1.0, "y" is the mole ratio of Si to (Al+E) and varies from about 6.5 to about 35; and "z" is the mole ratio of O to (Al+E) and has a value determined by the equation:

$$z=(m\cdot n+r\cdot p+3+4\cdot y)/2$$

and is characterized in that it has the x-ray diffraction pattern having at least the d spacings and intensities set forth in Table A:

TABLE A

| 2-θ | d (Å) | I/I₀ % |
|---|---|---|
| 6.40–6.90 | 13.80–12.80 | w–s |
| 6.95–7.42 | 12.70–11.90 | m–s |
| 8.33–9.11 | 10.60–9.70 | w–vs |
| 19.62–20.49 | 4.52–4.33 | m–vs |
| 21.93–22.84 | 4.05–3.89 | m–vs |
| 24.71–25.35 | 3.60–3.51 | w–m |
| 25.73–26.35 | 3.46–3.38 | m–vs | the process comprising forming a reaction mixture containing reactive sources of M, R, Al, Si and optionally E, and reacting the reaction mixture at reaction conditions which include a temperature of about 85° C. to about 225° C., for a period of time of about 1 day to about 28 days the reaction mixture having a composition expressed in terms of mole ratios of the oxides of:

$$aM_{2/n}O:bR_{2/n}O:1-cAl_2O_3:cE_2O_3:dSiO_2:eH_2O$$

where "a" has a value of 0 to about 25, "b" has a value of about 1.5 to about 80, "c" has a value of 0 to about 1.0, "d" has a value of about 10 to about 100, "e" has a value of about 100 to about 15000.

13. The process of claim 12 where a is zero.

14. The process of claim 12 where M is selected from the group consisting of lithium, sodium, cesium, strontium, barium and mixtures thereof.

15. The process of claim 12 where the source of M is selected from the group consisting of halide, nitrate, sulfate, hydroxide, or acetate compounds.

16. The process of claim 12 where R is selected from the group consisting of diethyldimethylammonium, ethyltrimethylammonium, hexamethonium and mixtures thereof.

17. The process of claim 12 where the source of R is the halide or hydroxide compounds of R.

18. The process of claim 12 where the aluminum sources are selected from the group consisting of aluminum isopropoxide, aluminum sec-butoxide, precipitated alumina and aluminum metal.

19. The process of claim 12 where the silicon sources are selected from the group consisting of tetraethylorthosilicate, colloidal silica, fumed silica and precipitated silica.

20. The process of claim 12 where the E sources are selected from the group consisting of alkali borates, boric acid, gallium oxyhydroxide, gallium sulfate, ferric sulfate, ferric chloride, chromium nitrate, indium chloride and mixtures thereof.

21. The process of claim 12 where the source of aluminum, silicon, and R is an organoammonium aluminosilicate solution.

22. A hydrocarbon conversion process comprising contacting a hydrocarbon with a catalytic composite at hydrocarbon conversion conditions to give a converted product, the catalytic composite comprising a microporous crystalline zeolite having a layered framework of at least $AlO_2$ and $SiO_2$ tetrahedral units and a composition on an as-synthesized and anhydrous basis expressed by an empirical formula of:

$$M_m^{n+}R_r^{p+}Al_{1-x}E_xSi_yO_z$$

where M is at least one exchangeable cation selected from the group consisting of alkali and alkaline earth metals, "m" is the mole ratio of M to (Al+E) and varies from 0 to about 2.0, R is at least one organoammonium cation selected from the group consisting of quaternary ammonium cations, diquaternary ammonium cations, protonated amines, protonated diamines, protonated alkanoamines and quaternized alkanolammoniumcations "r" is the mole ratio of R to (Al+E) and has a value of about 0.05 to about 5.0, "n" is the weighted average valence of M and has a value of about 1 to about 2, "p" is the weighted average valence of R and has a value of about 1 to about 2, E is an element selected from the group consisting of gallium, iron, boron, chromium, indium and mixtures thereof, "x" is the mole fraction of E and has a value from 0 to about 1.0, "y" is the mole ratio of Si to (Al+E) and varies from about 6.5 to about 35 and "z" is the mole ratio of O to (Al+E) and has a value determined by the equation:

$$z=(m\cdot n+r\cdot p+3+4\cdot y)/2$$

and is characterized in that it has the x-ray diffraction pattern having at least the d spacings and intensities set forth in Table A:

TABLE A

| 2-θ | d (Å) | I/I₀ % |
|---|---|---|
| 6.40–6.90 | 13.80–12.80 | w–s |
| 6.95–7.42 | 12.70–11.90 | m–s |
| 8.33–9.11 | 10.60–9.70 | w–vs |
| 19.62–20.49 | 4.52–4.33 | m–vs |
| 21.93–22.84 | 4.05–3.89 | m–vs |
| 24.71–25.35 | 3.60–3.51 | w–m |
| 25.73–26.35 | 3.46–3.38 | m–vs |

\* \* \* \* \*

UNITED STATES PATENT AND TRADEMARK OFFICE
CERTIFICATE OF CORRECTION

PATENT NO. : 6,756,030 B1
DATED : March 21, 2003
INVENTOR(S) : Lisa M. Rohde et al.

Page 1 of 1

It is certified that error appears in the above-identified patent and that said Letters Patent is hereby corrected as shown below:

Column 7,
Line 45, move "($C_2$ to $C_{12}$)" after "monoolefin".

Signed and Sealed this

Twelfth Day of July, 2005

JON W. DUDAS
*Director of the United States Patent and Trademark Office*